H. FUCHS.
FUEL GASIFIER FOR INTERNAL COMBUSTION ENGINES.
APPLICATION FILED DEC. 11, 1912.

1,081,228.

Patented Dec. 9, 1913.

2 SHEETS—SHEET 1.

Witnesses

Inventor
H. Fuchs
By Victor J. Evans
Attorney

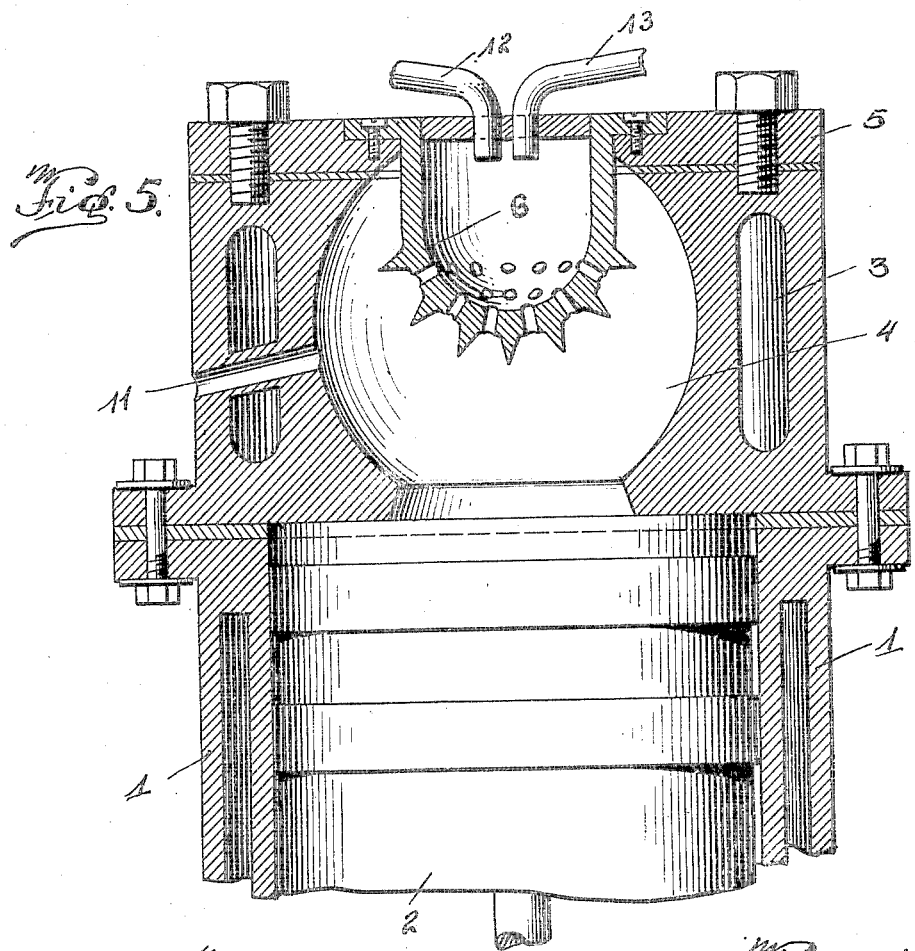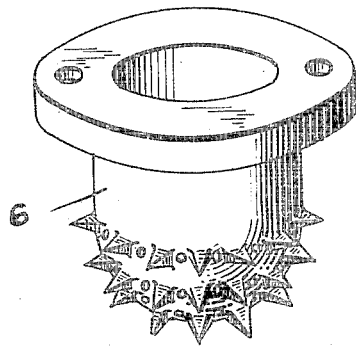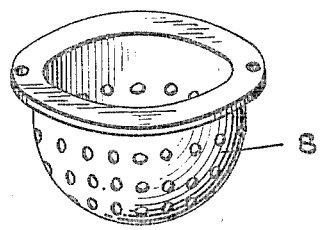

UNITED STATES PATENT OFFICE.

HERMAN FUCHS, OF ST. LOUIS, MISSOURI.

FUEL-GASIFIER FOR INTERNAL-COMBUSTION ENGINES.

1,081,228.

Specification of Letters Patent. Patented Dec. 9, 1913.

Application filed December 11, 1912. Serial No. 736,181.

*To all whom it may concern:*

Be it known that I, HERMAN FUCHS, a citizen of the United States, residing at St. Louis, in the State of Missouri, have invented new and useful Improvements in Fuel-Gasifiers for Internal-Combustion Engines, of which the following is a specification.

The present invention has relation to means for converting fuel of a nature heavier than gasolene into a gaseous mixture for use in internal combustion engines of either the four cycle or two cycle type, said means consisting of a gasifier arranged so as to be highly heated by the combustion of the gaseous mixture and to convert the incoming charge into gaseous form to be subsequently exploded to drive the piston on its next working stroke.

The invention contemplates a gasifier of novel form, the same consisting of a chamber or generating members or a combination of both, said gasifier being located in the end of the cylinder in which combustion takes place so as to be heated to a high temperature and also arranged with reference to the inlet so as to lie in the path of the incoming charge to convert the same into gaseous form.

The invention consists of the novel features, details of construction and combination of parts, which hereinafter will be more particularly set forth, illustrated in the accompanying drawings, and pointed out in the appended claim.

Figure 1:
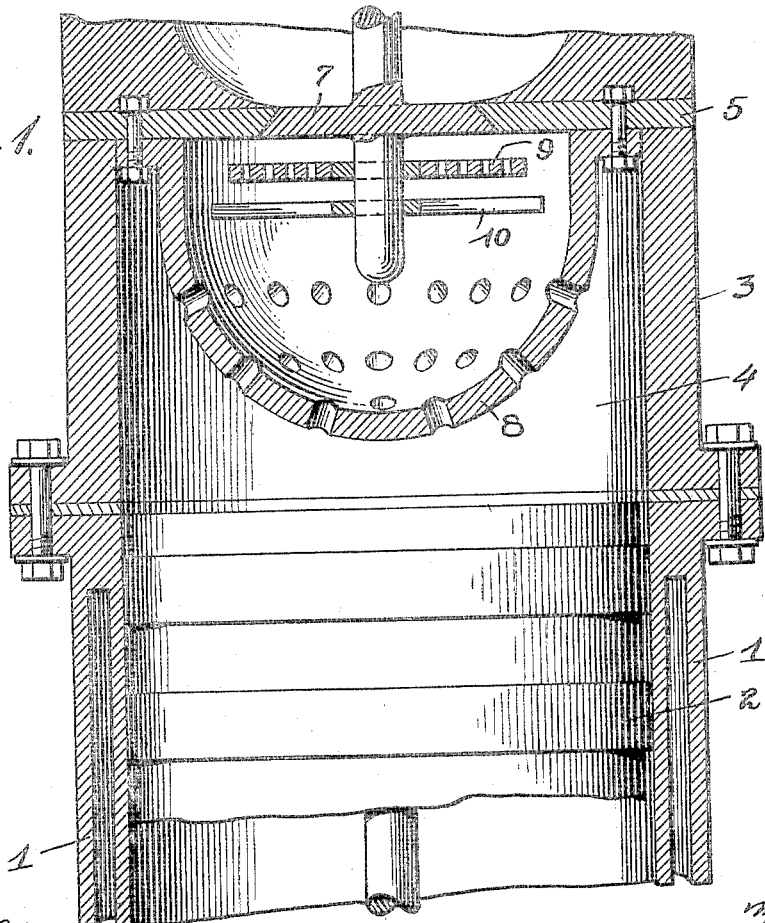
Figure 3:
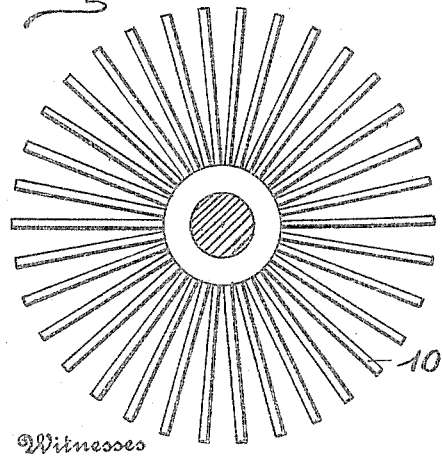
Figure 2:
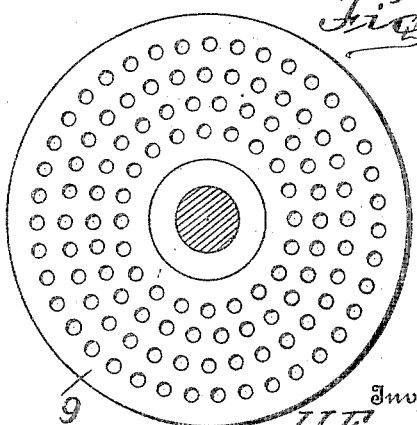

Referring to the drawings, forming a part of the specification, Figure 1 is a sectional view of an engine of the four cycle type provided with a gasifier embodying the invention. Fig. 2 is a top plan view of one of the generating members, the same consisting of a disk having a plurality of perforations. Fig. 3 is a view similar to Fig. 2 of a different form of generating member consisting of a hub and radiating fingers forming a spider. Fig. 4 is a detail perspective view of the generating chamber. Fig. 5 is a sectional view, showing the application of the invention to a two cycle engine. Fig. 6 is a detail perspective view of a modified form of generating chamber having annular fins or ribs.

Corresponding and like parts are referred to in the following description, and indicated in all the views of the drawings, by the same reference characters.

The numerals 1 and 2 designate well known parts of an internal combustion engine, whether of the four cycle or two cycle variety, the part 1 being a cylinder and the part 2 the piston arranged to operate therein. A band or ring 3 is bolted or otherwise secured to the end of the cylinder 1 and incloses a space 4 which constitutes a combustion chamber. A plate 5 is secured to the outer end of the band or ring 3 and has a central opening in which may be arranged a valve 7, as indicated in Fig. 1, or a chamber 6, as designated in Fig. 5. The valve 7 is employed when the invention is adapted for four cycle engines and controls the fuel inlet. The fuel may consist of kerosene or hydrocarbon of a greater specific gravity than gasolene and which is gasified on coming in contact with the heated gasifying elements. As indicated in Fig. 1 a generating chamber 8 is attached to the inner side of the plate 5 opposite the valve controlled inlet opening, said chamber being of cup form and having its sides formed with a plurality of openings. The chamber 8 is flanged at its upper edge, said flange being pierced and receiving the fastenings by means of which the generating chamber is attached to the plate 5. Gasifying members 9 and 10 have connection with the valve 7 and are movable therewith and are arranged so as to be highly heated by the gaseous mixture when combustion takes place. The generating member 9 consists of a perforated plate, whereas the member 10 is of the form of a spider comprising a hub and radiating fingers. It is to be understood that the members may be wholly of one kind and any number may be connected with the valve 7. The stem of the valve may be prolonged and receive the generating members or the latter may be connected to the valve in any manner.

It is to be understood that the valve 7 may be unseated by the suction of the piston or by mechanical means such as commonly provided in the construction of internal combustion engines. When the valve 7 is unseated a predetermined quantity of liquid fuel and a given amount of air pass through the opening closed by the valve 7 and the liquid fuel coming in contact with the heated generating members and chamber is gasified and commingling with the atmosphere entering therewith produces the gaseous mixture which may be ignited in any manner according to the style of the engine so as to generate motive power. The generating members and more particularly the generating chamber serve also to insure a thorough mixing of the fuel and air which is essential to produce a combustible mixture.

In the modification shown in Fig. 5 the fuel is forced into the combustion chamber 4 through a passage 11 formed in a side of the band or ring 3. The fuel upon entering the combustion chamber impinges against the generating chamber 6 and is gasified, said generating chamber being provided with a plurality of projections either in the nature of points, or fins, or ribs, whereby an extended heated surface is presented so as to instantly convert the fuel into gaseous form. The generating chamber is also formed in its sides with a plurality of openings whereby air and fuel may pass from the inside into the combustion chamber. Fuel may be admitted into the generating chamber 6 by means of a pipe 12 and air may be supplied through a pipe 13.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In an internal combustion engine, the combination of a cylinder provided with a fuel inlet, a chamber arranged within the cylinder and extending over the fuel inlet and provided in its sides with a plurality of openings, an inwardly opening valve for closing the fuel inlet and the perforated plate connected with the valve and arranged within the chamber and a spider comprising a hub and radiating fingers connected with said valve and likewise arranged within the chamber.

In testimony whereof I affix my signature in presence of two witnesses.

HERMAN FUCHS.

Witnesses:
 JAMES P. BLAKE,
 E. L. HARTRICH.